United States Patent
Zaccaria et al.

(10) Patent No.: US 7,027,992 B2
(45) Date of Patent: Apr. 11, 2006

(54) METHOD AND COMPUTERIZED SYSTEM FOR REDUCING RISK IN AN ENERGY INDUSTRY

(75) Inventors: Edward Zaccaria, Newtown, PA (US); David Hoog, Bala Cynwyd, PA (US); David Fromer, New York, NY (US); Mark Mayers, New York, NY (US); Dennis Kane, Island Heights, NJ (US); Kurt Husar, West Chester, PA (US); Gary Hawk, Monroe, GA (US); Paul O'Neill, Marietta, GA (US)

(73) Assignee: Ace Ina Holdings, Inc., Philadelphia, PA (US)

( * ) Notice: Subject to any disclaimer, the term of this patent is extended or adjusted under 35 U.S.C. 154(b) by 713 days.

(21) Appl. No.: 09/814,682

(22) Filed: Mar. 20, 2001

(65) Prior Publication Data
US 2002/0062231 A1 May 23, 2002

Related U.S. Application Data

(63) Continuation of application No. 09/369,699, filed on Aug. 6, 1999, now abandoned.

(51) Int. Cl.
*G06F 17/60* (2006.01)

(52) U.S. Cl. .................................. 705/4; 705/1; 705/7
(58) Field of Classification Search .................. 705/1, 705/4, 26, 10, 28; G06F 17/60
See application file for complete search history.

(56) References Cited

U.S. PATENT DOCUMENTS

| | | | | |
|---|---|---|---|---|
| 4,831,526 A | * | 5/1989 | Luchs et al. | 705/4 |
| 5,845,256 A | * | 12/1998 | Pescitelli et al. | 705/4 |
| 6,163,770 A | * | 12/2000 | Gamble et al. | 705/4 |
| 6,411,939 B1 | * | 6/2002 | Parsons | 705/35 |

FOREIGN PATENT DOCUMENTS

EP          1242934 A1  *  9/2002

OTHER PUBLICATIONS

Riegel et al., Insurance principles and practices—Insurance of Property, Fire, pp. 536–537 & 542–543, Prentice–Hall, Inc. 1966.*
From Dialog Classic, CIGNA Property & Casualty Launches New CIGNA Power Products Unit, PR Newswire Association, Jul. 27, 1998.*
John Conley, 3 winning ways, Risk Management, v46, n12, p12, Dec. 1999 (From Dialog(R) file 16, acc. No. 06994461).*

(Continued)

*Primary Examiner*—Cuong Nguyen
(74) *Attorney, Agent, or Firm*—Reed Smith LLP

(57) ABSTRACT

A method and computerized system for reducing risk actually assumed by at least one of a plurality of parties, wherein at least one of the parties supplies electric power to at least one other of the parties, and if an unplanned at least partial failure to supply the electric power occurs, at least one of the parties assumes the risk. The method includes designating at least one factor associated with the supplying of electric power and for determining whether an unplanned at least partial failure to supply the electric power that occurs is a qualifying event; designating a compensation which will at least partially reduce the risk actually assumed by the at least one of the parties assuming the risk if the unplanned at least partial failure to supply the electric power occurs and is determined to be a qualifying event; and, establishing a relationship between the at least one of the parties assuming the risk and at least one other party. The at least one other party agrees to provide the compensation to the at least one of the parties assuming the risk if the unplanned at least partial failure to supply the electric power occurs and is determined to be a qualifying event.

38 Claims, 2 Drawing Sheets

OTHER PUBLICATIONS

Robinson et al., Commercial Property Insurance—vol. 3, Jun. 1993., Inter. Risk Management institute, Inc.*
Fitzgerald, Not so risky business . . . , Chemical Marketing Reporter, v250, n3 pSR18(1), Jul. 15, 1996.*
From Dialog(R) file 624, CIGNA Announces Products to Insure Against Price Swing in the Power Market, Global Power Report, Aug. 7, 1998p. 7 vol. 76, No. 147.*
Watanabe, Pub–No. JP 2002236724A, Energy trading system, (assignee: Yamatake Corp.) Aug. 23, 2002.*
Brevetti, Nuclear power Plants Soon will have two cover choices, New York, Aug. 28, 1986.*
Riegel et al., Insurance principles and practices, Prentice–Hall, Inc., 5th edition, 1966, pp. 536–537, 542–543.*
Rodda et al., Commercial property risk management & insurance, vol. 1, 3rd edition, 1988, pp. 24–26, 280–286.*
From http://www.findarticles.com, Potential for lower prices only one part of utility restructuring story, Business Wire, Oct. 29, 1998.*
Andrew Webb, The rebirth of the power market, Derivatives Strategy, May 1999 (from http://www.derivativesstrategy.com/magazine/archive/999/0599fea2.asp).*
From http://www.findarticles.com, Uniform business rules a top priority to restructure US energy markets, Business Wire, Sep. 29, 1999.*
Unknown, AAE: only congress can help avoid repeat of midwest price spikes, PR Newswire, Nov. 10, 1998.*
Ed Zaccaria, The power of insurance, Independent Energy, v29n7, pp. 24–25, Sep. 1999 (from Dialog(R) file 15, acc. No. 01976137).*
From http://www.findarticles.com, Electric co–ops prepared to keep the lights on into the year 2000, PR Newswire, Aug. 3, 1999.*
From http://www.findarticles.com, Unitil Power Corp. to sell power supply portfolio, Business Wire, Sep. 13, 1998.*
From http://www.findarticles.com, GPU energy reaches settlements in Pa. restructuring cases, Business Wire, Sep. 24, 1998.*
Samuel Oren et al., Interruption insurance for generation & distribution of electric power,Jour. of Regulatory Economics, 1990.*
Oren et al., Onsite backup generation & interruption insurance for electricity distribution, Energy Journal, 1991, vol. 12, issue 4, (a total of 5 pages from EBSCOhost—printed on Oct. 22, 2003).*
Oren et al., Priority network access pricing for electric power, Jour. of Regulatory Economics, 19:3 239–270, 2001.*
Joseph A Doucet, Coordination of non–utility generation through priority purchase contracts, Energy Journal, 1994 vol. 15 issue 1 (EBSCO host, printed on Oct. 22, 2003).*
Joseph N. DiStefano, Bermuda businessman to buy Philadelphia–based insurance giant—Cigna, Dialog File 20, acc. No.04257523, published on Feb. 8, 1999.*
Unknown, Cigna announces products to insure against price swings in power market, Aug. 7, 1998, Dialog File 624, acc. No. 00959494.*
Brevetti's article on New York newspaper, Nuclear power plant soon will have two choices, New York, Aug. 28, 1986.*
Oren et al., Priority pricing of interruptible electric service with an early notification option, Energy Journal, vol. 14, issue 2, 1993 (total printed 7 pages from EBSCOhost).*

* cited by examiner

METHOD AND COMPUTERIZED SYSTEM FOR REDUCING RISK IN AN ENERGY INDUSTRY

RELATED APPLICATION

This application is a continuation of U.S. patent application Ser. No. 09/369,699, filed Aug. 6, 1999 now abandoned, entitled "METHODS FOR INSURING RISKS IN RESTRUCTURED ENERGY INDUSTRY AND COMPUTER-IMPLEMENTED SYSTEMS FOR ISSUING AN INSURANCE POLICY WHICH INSURES RISKS IN RESTRUCTURED ENERGY INDUSTRY".

FIELD OF THE INVENTION

The present invention relates to methods for reducing assumed risks in a restructured energy industry and computer-implemented systems for establishing relationships for reducing such risks.

BACKGROUND OF THE INVENTION

In the restructured electric power market, electric power suppliers (e.g., power generators that do not sell some or all of their power directly to end-users or power re-marketers that do not resell some or all of their power) typically sell electric power to power purchasers pursuant to either "unit contingent" or "financially firm" power supply contracts. In the "unit contingent" contracts, the electric power supplier is typically not financially responsible to the purchaser if, for example, the equipment (e.g., generator(s) and/or transformer(s)) used for supplying power under the contract fail in whole or in part due to an unplanned event (e.g., an unplanned outage or derate of a unit). Thus, in the case of "unit contingent" contracts, the power purchaser typically must purchase replacement power in the open market at the time of the unplanned event. The cost of such power is unpredictable and extremely volatile. "Financially firm" power supply contacts are, in essence, the converse of "unit contingent" contracts. Such "financially firm" power supply contracts usually have liquidated damages provisions. Thus, in "financially firm" contracts, the electric power supplier is contractually obligated to deliver power to the purchaser and, thus, must purchase replacement power on the open market for the power purchaser in the case of an unplanned event that, for example, causes the equipment used for supplying power under the contract to fail in whole or in part. Thus, in "financially firm" contracts, the financial risks associated with purchasing replacement power are borne by the power supplier rather than by the power purchaser.

Both buyers and sellers of electric energy thus face significant financial risks in a restructured market. Such risks include power generation availability, transmission reliability, and financial performance of counter-parties or trading partners in a market in which prices are highly volatile. Volatility in energy prices results in higher budgets, reduced profitability and, ultimately, stock prices. Prior to the invention of the methods and systems defined herein, the only method for dealing with such risks were one-on-one counterparty deals and speculative financial instruments.

The present invention offers advantages over financial instruments and other prior art solutions. The present invention provides methods and systems of insuring risks with predictable pricing based on risk assessment, rather than market mechanisms; coverage for individual exposures; coverage for any amount, for any time period, and for particular risks identified by the insured, in short, complete flexibility in program design.

The present invention allows sellers of electric energy to market power to more customers and with greater confidence and allows buyers of electric energy to seek out alternative sources of power at different levels of firmness, obtain favorable terms and lock in savings.

As electric power restructuring progresses, power transactions are becoming a critical part of corporate business plans. Sellers with access to power must find new buyers. Buyers must achieve assured delivery at the lowest practical cost. Buyers must understand the force majeure/liquidated damage provisions in their contracts and realize that buying a fixed cost contract is not always the most effective solution to meeting their energy needs.

The methods and systems of the present invention combine custom tailored risk management solutions which are an innovative means of managing budgets, reducing costs and obtaining greater flexibility in the restructured electric power industry.

SUMMARY OF THE INVENTION

A method and computerized system for reducing risk actually assumed by at least one of a plurality of parties, wherein at least one of the parties supplies electric power to at least one other of the parties, and if an unplanned at least partial failure to supply the electric power occurs, at least one of the parties assumes the risk, the method including: designating at least one factor associated with the supplying of electric power and for determining whether an unplanned at least partial failure to supply the electric power that occurs is a qualifying event; designating a compensation which will at least partially reduce the risk actually assumed by the at least one of the parties assuming the risk if the unplanned at least partial failure to supply the electric power occurs and is determined to be a qualifying event; and, establishing a relationship between the at least one of the parties assuming the risk and at least one other party, wherein the at least one other party agrees to provide the compensation to the at least one of the parties assuming the risk if the unplanned at least partial failure to supply the electric power occurs and is determined to be a qualifying event.

BRIEF DESCRIPTION OF THE DRAWINGS

Other objects, features and advantages of the present invention will become more fully apparent from the following detailed description of the preferred embodiments, the appended claims and the accompanying drawing in which:

DETAILED DESCRIPTION OF THE PREFERRED EMBODIMENTS

Figure 1:
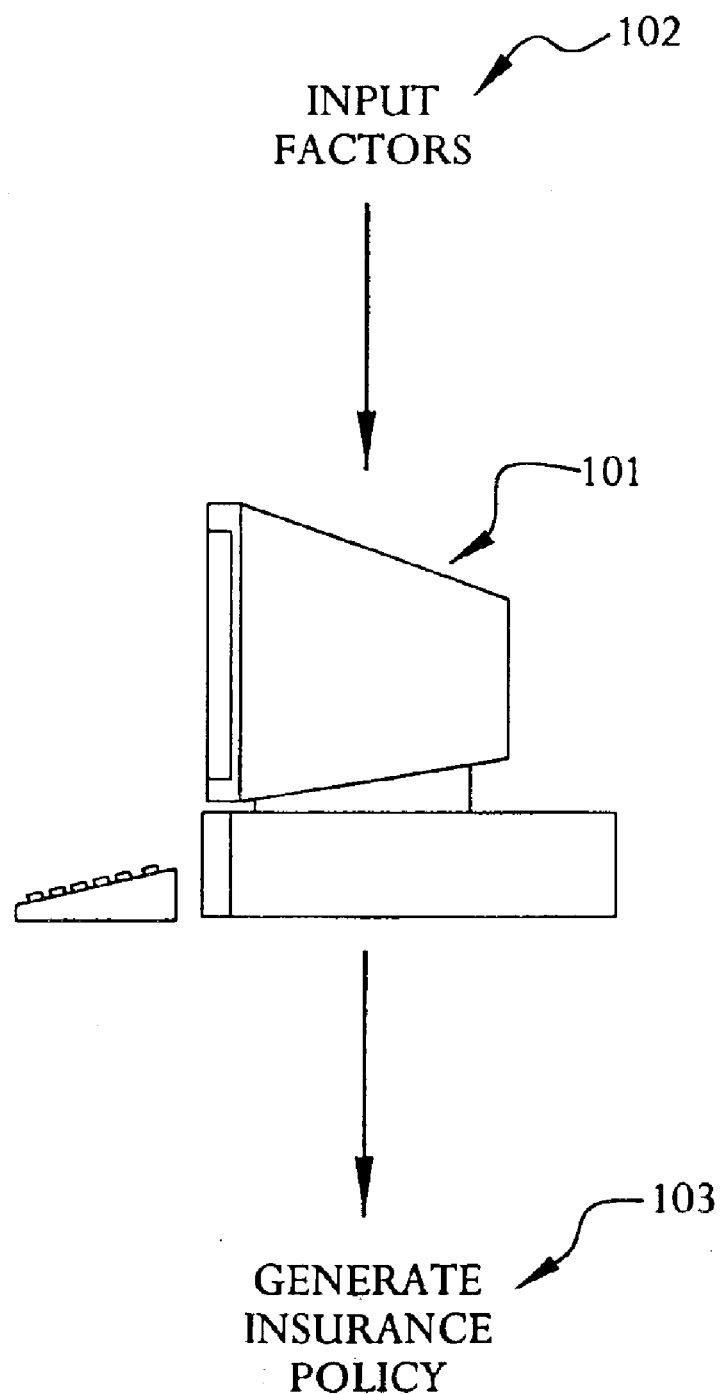
FIG. 1 is a diagram of the computer-implemented system for generating an insurance policy; and, FIG. 2 is a diagram of the computer-implemented system for generating an insurance policy formed from a plurality of networked computers.

The entire disclosure of U.S. patent application Ser. No. 09/369,699, filed Aug. 6, 1999, entitled "METHODS FOR INSURING RISKS IN RESTRUCTURED ENERGY INDUSTRY AND COMPUTER-IMPLEMENTED SYSTEMS FOR ISSUING AN INSURANCE POLICY WHICH INSURES RISKS IN RESTRUCTURED ENERGY INDUSTRY" is hereby incorporated by reference herein.

The present invention is directed to a method for insuring against risks in an energy industry, wherein an electrical power purchaser has an underlying power supply contract with a contracting power supplier, and the contracting power supplier has no obligation to supply electrical power to the electrical power purchaser in the case of an unplanned event that prevents the contracting power supplier from meeting all or part of the supplier's power requirements under the power supply contract. The supplier's power requirements which the electrical power purchaser seeks to have covered are designated in an insurance policy. The insurance policy provides insurance coverage to the electrical power purchaser that protects the electrical power purchaser from financial losses (e.g., the volatility associated with replacement power costs) associated with the occurrence of an unplanned event. A coverage period in which the insurance policy will be in effect, an insured price for replacement or substitute power, and one or more unplanned events which give rise to a need for replacement or substitute power are also designated in the insurance policy. The designated unplanned events trigger an indemnification obligation under the insurance policy if a market price for replacement power exceeds the insured price. In the method of the present invention, the insurer receives a premium payment from the insured in consideration for the indemnification obligation of the insurer under the insurance policy during the coverage period. After issuance of the insurance policy by the insurer, the insurer is obligated to indemnify the electrical power purchaser from financial losses associated with the occurrence of an unplanned event, by reimbursing the insured for costs associated with the replacement power or by supplying substitute power to the insured, upon the triggering of an indemnification obligation which occurs during the coverage period.

The present invention is also directed to a method for insuring against risks in an energy industry, wherein a power supplier has an underlying power supply contract with a contracting electrical power purchaser, and the power supplier has an obligation to supply electrical power to the electrical power purchaser in the case of an unplanned event that prevents the power supplier from meeting all or part of the power supplier's obligations under the power supply contract. The supplier's power obligation which the power supplier seeks to have covered is designated in an insurance policy. The insurance policy provides insurance coverage to the power supplier that protects the power supplier from financial losses associated with the occurrence of an unplanned event. A coverage period in which the insurance policy will be in effect, an insured price for replacement or substitute power, and one or more unplanned events which give rise to a need for replacement or substitute power are also designated in the insurance policy. The designated unplanned events trigger an indemnification obligation under the insurance policy if a market price for replacement power exceeds the insured price. In the method of the present invention, the insurer receives a premium payment from the insured in consideration for the indemnification obligation of the insurer under the insurance policy during the coverage period. After issuance of the insurance policy by the insurer, the insurer is obligated to indemnify the power supplier from financial losses associated with the occurrence of an unplanned event, by reimbursing the insured for costs associated with the replacement power or by supplying substitute power to the insured, upon the triggering of an indemnification obligation which occurs during the coverage period.

The present invention is also directed to a computer-implemented system for generating an insurance policy for insuring against risks in an energy industry wherein an electrical power purchaser has an underlying power supply contract with a contracting power supplier, and the contracting power supplier has no obligation to supply electrical power to the electrical power purchaser in the case of an unplanned event that prevents the contracting power supplier from meeting all or part of the supplier's power requirements under the power supply contract. The invention includes a computer that accepts as its inputs at least the following factors: the supplier's power requirements which the electrical power purchaser seeks to have covered by an insurance policy, wherein the insurance policy provides insurance coverage to the electrical power purchaser that protects the electrical power purchaser from financial losses associated with the occurrence of an unplanned event; a coverage period in which the insurance policy will be in effect; an insured price for replacement or substitute power; and one or more unplanned events which give rise to a need for replacement or substitute power, and which trigger an indemnification obligation under the insurance policy if a market price for replacement power exceeds the insured price. The computer generates the policy in accordance with, at least, the factors set forth above. Under the insurance policy, the insurer is obligated to indemnify the insured by reimbursing the insured for costs associated with replacement power or supplying substitute power to the insured.

The present invention is also directed to a computer-implemented system for generating an insurance policy for insuring against risks in an energy industry wherein a power supplier has an underlying power supply contract with a contracting electrical power purchaser, and the power supplier has an obligation to supply electrical power to the electrical power purchaser in the case of an unplanned event that prevents the power supplier from meeting all or part of the power supplier's obligations under the power supply contract. The invention includes a computer that accepts as its inputs at least the following factors: the supplier's power obligation which the power supplier seeks to have covered by an insurance policy, wherein the insurance policy provides insurance coverage to the power supplier that protects the power supplier from financial losses associated with the occurrence of an unplanned event; a coverage period in which the insurance policy will be in effect; an insured price for replacement or substitute power; and one or more unplanned events which give rise to a need for replacement or substitute power, and which trigger an indemnification obligation under said insurance policy if a market price for replacement power exceeds the insured price. The computer generates the policy in accordance with, at least, the factors set forth above. Under the insurance policy, the insurer is obligated to indemnify the insured by reimbursing the insured for costs associated with replacement power or supplying substitute power to the insured.

In the preferred embodiment, the unplanned event insured under the policy may be a failure in power generation, a failure of power transmission, an intervention by a control area which directs that certain power be backed down or cut off, or a failure to perform by a counterparty to a contract. Such unplanned events may be associated with, for example, an unplanned derate and/or unplanned outage of power.

The indemnification obligation of the insurer preferably includes making substitute power available for the insured at an insured price at a point of power delivery or, alternatively, paying the insured for a replacement power loss. Pursuant to one aspect of the invention, if the unplanned event occurs during a time period which is not covered by the policy, the insurer has no indemnification obligation. Pursuant to other aspects of the invention, the insurer's indemnification obligation is limited by an outage/derate limit, by a dollar amount and/or by the amount of substitute power the insurer must supply or replacement power for which the insurer must pay.

A blank Exemplary Certificate of Insurance, which is included within this Detailed Description may accompany an insurance policy issued in accordance with the present invention. When an insured seeks to insure against risks in accordance with the methods and systems of the present invention through procurement of an insurance policy, the items identified on an insurance certificate such as the one appearing herein are designated. In particular, one or both parties designate, as applicable, the description of the transaction for which the insured seeks insurance (e.g., the underlying contract between the insured and another party for supplying power), the type of coverage desired (e.g., generation outage and derate protection), the retroactive effective date, the coverage effective date, the coverage expiration date, the identity and number of electrical power sources (i.e., the insured units) (e.g., particular generator(s) and/or transformer(s) used for supplying power under a power supply contract), the dependable capacity of each electrical power source, the unplanned event (i.e., the insured event), the insured quantity of electrical power, the outage/derate limit, the insured price for power, the market price for power, the insured hours, coinsurance, the aggregate capacity deductible for a system of insured units or the capacity deductible for each insured unit, the aggregate dollar deductible, the aggregate coverage period limit, the points of delivery, and any endorsements to the policy. One or more of the foregoing items may not be applicable and, thus, may not be designated in connection with a particular policy. Similarly, the insured may elect to designate certain of these factors, such as coinsurance, the capacity deductible or the aggregate capacity deductible, or the aggregate dollar deductible as zero.

The insurer considers the applicable factors, as well as any applicable physical characteristics of the designated electrical power sources, historical data, projections, and any applicable power market factors (e.g., estimated future costs of replacement power) which are obtained by the insurer through the insurer's investigation, and determines the premium amount. The insurer receives the premium payment from the insured and the policy is issued.

The policy may be generated in accordance with the present invention by a computer-implemented system which accepts as its inputs a variety of factors including those referred to above. FIG. 1 depicts the computer-implemented system of the present invention 100 wherein the computer 101 accepts a variety of factors as its inputs 102 and generates a policy 103 based on the factors. The computer-implemented system may also be formed from a plurality of networked computers 200 as shown in FIG. 2.

Figure 2:
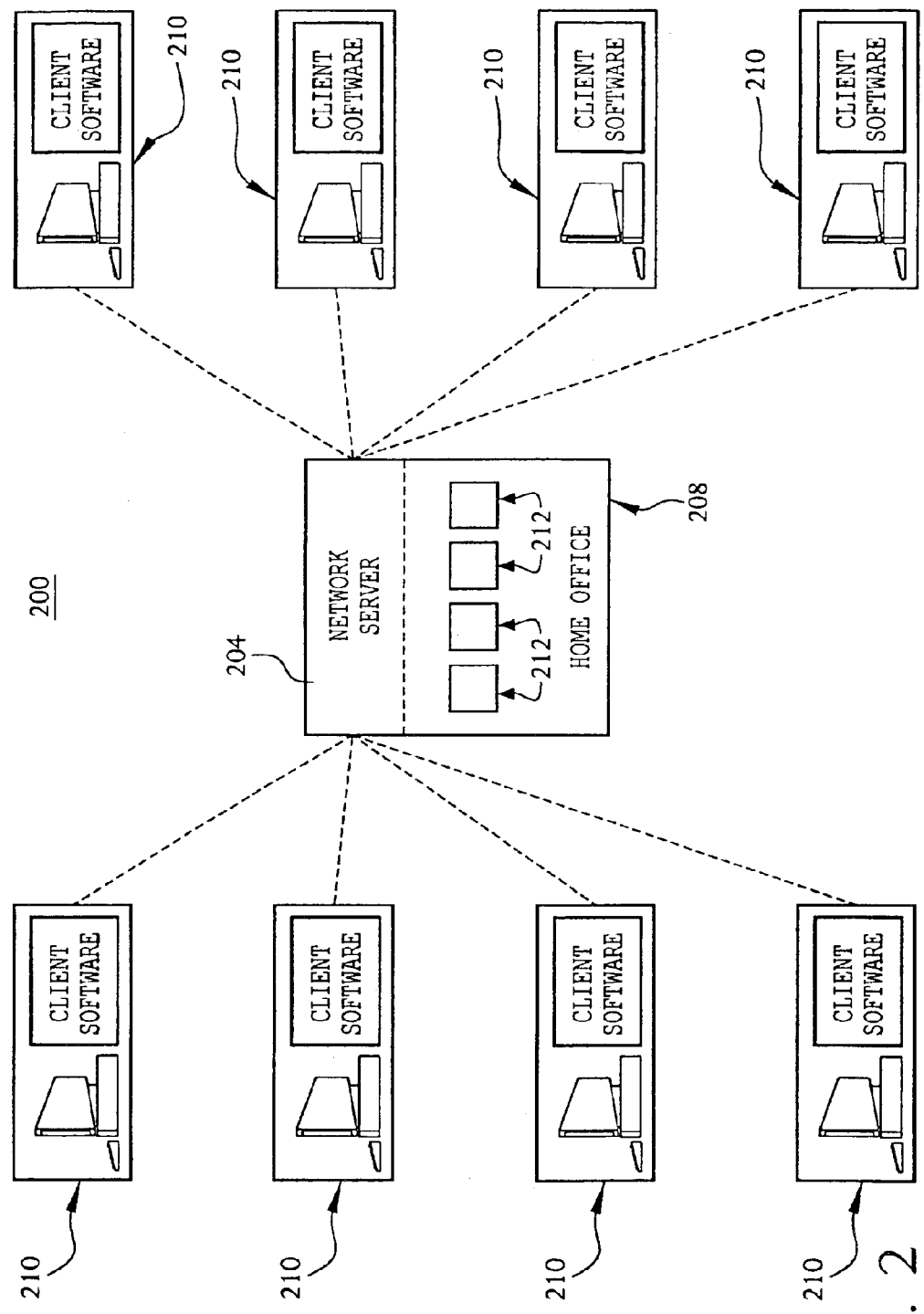

Referring to FIG. 2, there is shown a hardware block diagram of a system 200 for implementing the system 100 described above, in accordance with a preferred embodiment of the present invention. System 200 is preferably formed of a plurality of remote workstations 210, each of which includes client software for communicating with a network server 204 located at the home office 208 of the insurance company or its designee, that is issuing the subject insurance policies. A plurality of workstations 212 are included at the home office for auditing information submitted by insurance business producers through workstations 210. In an alternative embodiment, the workstations 210 may be those of an insured pursuant to which input factors used in connection with generating and issuing an insurance policy are inputted by the insured at the workstation 210 and communicated with the insurance company home office 208 via the network server 204.

An Exemplary Insurance Policy issued in accordance with the methods and systems of the present invention, along with a completed exemplary certificate of insurance is included within this Detailed Description. In this exemplary policy, the insured is covered against generation risks associated with unplanned outages and/or derates. Many of the terms used in this application are defined specifically in this Exemplary Insurance Policy. Those definitions represent exemplary definitions for such terms but it will be understood by those skilled in the art that the precise definitions used can vary from policy to policy and such variations are within the scope of the invention.

The insured under the policy can be any buyer of electrical power, such as a wholesale purchaser (e.g., a utility or power marketer), a retail purchaser or a load aggregator. The insured under the policy can also be any seller of electrical power, such as a power re-marketer, an electric cooperative, a load aggregator, a utility (e.g., a municipal utility or an investor-owned utility), an independent power producer, or an energy services company. Many of the foregoing entities may be either a seller or a buyer.

The underlying contract can be any contract which, upon the occurrence of an unplanned event, results in the need for the insured to purchase replacement power or receive substitute power, and where the market price for replacement power is volatile, the insured suffers a financial loss when it purchases the replacement power. For example, the underlying contract or obligation which forms the basis of the risk that the insured seeks to insure can be a power supply contract. The power supply contract can be a "unit contingent" power supply contract pursuant to which the power supplier is not obligated to supply power to the purchaser. In that case, the power purchaser will seek to insure against an unplanned event which gives rise to the need for the power purchaser to purchase replacement power or receive substitute power at a time when the market price for power is high. The power supply contract may also be a "financially firm" power supply contract pursuant to which the power supplier is obligated to supply power to the purchaser in a fixed quantity and/or at a fixed price. In that case, the power supplier will seek to insure against an unplanned event which gives rise to the need for the power purchaser to purchase replacement power or receive substitute power at a time when the market price for power is high. The contract may also be, for example, a "system firm" contract pursuant to which a utility, for example, may agree to sell power to another unless a particular event occurs (for example, a load increase or generation loss) and, if such event occurs, the utility may not supply power.

The unplanned event can be a failure in generation, in whole or in part (an availability risk); a failure in transmission, for example, a transmission curtailment resulting from unplanned intervention by a control area or a transmission interruption (a reliability risk); or a failure in counter-party performance, for example, a breach of contract, loss of financial capacity, bankruptcy, or third party breach of an interchange agreement (a performance risk); resulting in, for example, an unplanned outage and/or an unplanned derate, a need to purchase replacement power or to receive substitute power.

The market price may be calculated or determined in any manner agreed to by the parties including, for example, in accordance with a published index, which may or may not be adjusted. The market price for replacement power can also be, for example, the actual cost at which the insured, acting in a commercially reasonable manner and under a duty to mitigate losses, procures replacement power.

The coverage period of the policy can be any number of days. The policy provides coverage for the number of days in a week and the number of hours, or portions of hours, in each day designated. The designated hours can be on-peak hours, off-peak hours, or a combination of both on-peak and off-peak hours.

The insurer's indemnification obligation for a given unplanned event is determined in accordance with certain factors which may include, but need not be limited to, the market price for replacement power, the capacity deductible (which, for example, may be applicable to each electrical power source) or an aggregate capacity deductible (which, for example, may be applicable to an entire system of electrical power sources) and an amount of power loss associated with the unplanned event.

One or more electrical power sources to be covered by the policy may be designated. Also, the dependable capacity associated with each electrical power source may be designated. The dependable capacity can be determined, for example, in accordance with the capacity that the electrical power source can sustain over the coverage period and is calculated by modifying a maximum capacity of the electrical power source for any limitations on the maximum capacity of the electrical power source over a period of time. Other manners of calculating the dependable capacity are possible and within the scope of the invention.

In one embodiment, in order to satisfy the insurer's indemnification obligation, the insurer must either, at insurer's option, (1) make substitute power available for the insured to purchase at the insured price at one or more points of delivery designated or (2) pay the insured an amount equal to the replacement power loss. The replacement power loss amount is calculated by multiplying (A) the dollar amount by which the market price for replacement power exceeds the insured price times; (B) the insured quantity of electrical power, wherein the insured quantity of electrical power is calculated by subtracting 1) the aggregate capacity deductible from the total quantity of power associated with the unplanned event for all electrical power sources implicated by the unplanned event or 2) the capacity deductible from the total quantity of power associated with the unplanned event for each electrical power source implicated by the unplanned event; for each insured hour or portions of an insured hour implicated by the unplanned event. In an alternative embodiment, the indemnification obligation of the insurer consists of making substitute power available for the insured to purchase at the insured price. In a further embodiment, the insurer's indemnification obligation consists of paying the insured an amount equal to a replacement power loss.

There may be one or more limitations on the insurer's obligation to indemnify the insured when there is an unplanned event. For example, if replacement power is purchased at a market price which is at or below the insured price, the insurer has no indemnification obligation. Similarly, the insurer has no obligation to secure substitute power for the insured when the market price is less than the insured price. Also, the insurer's indemnity obligation may be limited by an aggregate coverage period limit designated, which is the insurer's maximum indemnity obligation in dollars. A coinsurance percentage may be designated, which is a percentage that is multiplied by the replacement power loss amount to determine a dollar amount of each replacement power loss that is excluded from the insurer's indemnity obligation. An aggregate dollar deductible may also be designated, which is an amount that the sum of all replacement power losses must exceed in the aggregate before the insurer is obligated to indemnify the insured for any additional replacement power loss or losses.

An outage/derate limit may also be designated which may also limit the insurer's indemnity obligation. The outage/derate limit is a period of consecutive calendar or business days or hours that each unplanned outage or unplanned derate of each electrical power source can contribute to the insured quantity. Where there is an unplanned outage, the beginning time of this period is the date or hour the electrical power source is electrically disconnected from the grid and the end time is the earlier of 1) the date or hour on which the electrical power source is in commercial operation or 2) the expiration of the outage limit. A ramp up period after an outage period can also be covered. Where there is an unplanned derate, the beginning time is the date or hour on which the unplanned derate begins and the end time is the earlier of 1) the date or hour on which the electrical power source is capable of achieving a generating level that is greater than the level it was generating at during the unplanned derate or 2) the expiration of the derate limit.

There may be one or more exclusions to coverage indicated in the policy, for example, those set forth in Sections 15 and 16 of the Exemplary Insurance Policy. One or more of these exclusions may be underwritten by the insurer, and, thus, not excluded from coverage.

Thus, protection against generation-related exposures in accordance with the present methods and systems, among other benefits, creates the capability on the part of the insured to buy or sell financially firm power from a single or multiple generation source; allows the insured to lock in savings or cost by eliminating wide swings in the price/cost of power; reduces financial uncertainty associated with unplanned unit outages or derates; reduces the basis risk connected with existing financial instruments; and allows the insured expand product offerings and trading limits.

Further, protection against transmission-related exposures, including those resulting from interventions by a control area, in accordance with the methods and systems of the present invention, among other benefits, increases the opportunity of the insured to contract with new sources of power; provides additional alternatives in power sources, transmission interfaces and delivery points; protects against the risk that a transaction may become uneconomic because of a curtailment or a constraint in the contract path; and expands the range of deal structures.

Finally, protection against performance risks of counterparties in accordance with the methods and systems of the present invention, among other benefits, increases the number of viable counterparties for insured power transactions; avoids the risk of dealing with unrated trading partners and the consequences of a counterparty's failure to perform; eliminates credit losses; eliminates the need for administrative expenses connected with screening trade partners, credit evaluations, letters of credit, security deposits, or guarantees; and establishes, in advance, the "cost of risk" and incorporates it into contract terms.

The following are illustrative examples of the methods and systems according to this invention. Although the examples utilize only selected factors, it should be understood that the following examples are illustrative and not limitative.

EXAMPLE 1

The insured is a power supplier with a "financially firm" contract to provide power to a power purchaser at $100 per megawatt hour (MWh). The insured purchases coverage for generation outage and derate protection from a period of Jan. 1, 1998, through Dec. 31, 1998, seven days a week, 24 hours a day. The insured designates three electrical power sources, Units 1, 2, and 3, with dependable capacities of 100 MW, 150 MW, and 200 MW, respectively. The aggregate coverage period limit designated by the insured is $10 million in aggregate for the portfolio of all electrical power sources. The capacity deductible designated by the insured is 25 MW for each insured unit. The insured quantity designated by the insured is the hourly concurrent unplanned outages, which is determined by the dependable capacity less the deductible and the concurrent unplanned derates, which is determined by the derated capacity less the deductible, among the electrical power sources. The insured price designated by the insured is $100/MWh for the entire coverage period. The market price of power is designated by the insured to be determined in accordance with the actual price of replacement power. The insured also designates one or more points of delivery for any substitute power which may become necessary.

The insurer calculates the premium based upon the factors designated by the insured as well as other factors, including those involving the physical characteristics of Units 1, 2 and 3 historical data, projections and power market factors. The insurer receives the premium from the insured and issues the policy.

On Feb. 3, 1998, Unit 2 experiences a generation outage which is covered by the policy for 2 hours which results in the insured having to purchase replacement power in order to satisfy its obligations under the firm contract. The market price (the actual cost) of replacement power is $100/MWh. The insurer has no obligation under the policy because the market price of replacement power is equal to the insured price.

EXAMPLE 2

The facts are the same as in Example 1 except that the insured designates the aggregate capacity deductible as 200 MW for the system of Units 1, 2, and 3, and the market price of replacement power is $150/MWh. The insured has no indemnification obligation because the total megawatt quantity of the unplanned event (an outage of Unit 2) is only 150 MW which is less than the aggregate deductible designated by the insured.

EXAMPLE 3

The facts are the same as in Example 1 except that the actual cost of replacement power is $200/MWh. The insurer must either make substitute power available in an amount equal to the insured quantity as calculated below at the price of $100/MWh at the point of delivery or, alternatively and at the insurer's option, the insurer must pay the insured for a replacement power loss in the amount of $25,000 which is calculated by multiplying the market price of replacement power minus the insured price [$200/MWh–$100/MWh]; by the insured quantity, which is the total quantity of the unplanned power event minus the capacity deductible [150 MW–25 MW]; by the insured hours [2 hours].

EXAMPLE 4

The facts are the same as in Example 1 except that the actual cost of replacement power is $9,000/MWh. Furthermore, Unit 3 also experiences an unplanned outage, which is covered by the policy, for a period of 8 hours . The actual price of replacement power is also $9,000/MWh during this 8 hour time period. The insurer must either make substitute power available in an amount equal to the insured quantity as calculated below at the price of $100/Wh at the point of delivery or, alternatively and at the insurer's option, the insurer must pay the insured for a replacement power loss. In this example, the replacement power loss is $14,685,000 which is calculated by multiplying the market price of replacement power minus the insured price [$9000/MWh–$100/MWh] for units 2 and 3; by the insured quantity, which is the total quantity of the unplanned power event minus the capacity deductible; by the insured hours ([150 MW–25 MW] times [2 hours] for Unit 2 and [200 MW–25 MW] times [8 hours] for Unit 3). This amount exceeds the aggregate coverage period limit. Thus, the insurer is only obligated to pay the insured $10 million, which is the insurer's aggregate coverage period limit.

EXAMPLE 5

The facts are the same as in Example 4 except that instead of designating a capacity deductible for each electrical power source, the aggregate capacity deductible designated by the insured is 100 MW for all designated electrical power sources. Also, Unit 3 experiences an outage for the same 2 hours as does Unit 2, instead of 8 hours as in Example 3. The insurer must either make substitute power available in an amount equal to the insured quantity as calculated below at a price of $100/MWh at the point of delivery or, alternatively and at the insurer's option, the insurer must pay the insured for a replacement power loss in the amount of $4,450,000 which is calculated by multiplying the market price of replacement power minus the insured price [$9000/MWh–$100/MWh] for Units 2 and 3; by the insured quantity which is the total quantity of the unplanned power event [350 MW (i.e., 150 MW for Unit 2 and 200 MW for Unit 3)] minus the aggregate capacity deductible of [100 MW] which is equal to 250 MW; by the insured hours [2 hours].

EXAMPLE 6

The insured is a power marketer with a "unit contingent" contract with a power supplier pursuant to which the power supplier supplies power to the power marketer. Under the "unit contingent" contract, the power supplier is not obligated to supply power to the power marketer in the event of an unplanned outage or derate. The power marketer is obligated to resell power under one or more contracts in a quantity of 100 MW at a rate of $100 MWh.

The insured purchases coverage for generation outage and derate protection from a period of Mar. 1, 1998, through Sep. 30, 1998, five days a week (Monday through Friday), 16 peak hours a day. The insured designates 10 electrical power sources, Units 1 through 10, which generate the power it purchases from the power supplier under the "unit contingent" contract, each having a dependable capacity of 100 MW. The aggregate coverage period limit designated by the insured is $15,000,000 in aggregate for the portfolio of all electrical power sources. The capacity deductible designated by the insured is 25 MW for each insured unit. The insured quantity designated by the insured is the hourly concurrent unplanned outages, which is determined by the dependable capacity less the deductible and the concurrent unplanned derates, which is determined by the derated capacity less the deductible, among the electrical power sources, but in no event shall the insured quantity exceed 50 MW. The insured price designated by the insured is $100/MWh for the entire coverage period. The market price for replacement power is designated by the insured to be that price as indicated by a particular power market index. The insured designates a point of delivery for substitute power.

The insurer calculates the premium based upon the factors designated by the insured as well as other factors, including those involving the physical characteristics of each of the 10 Units and power market factors. The insurer receives the premium from the insured and issues the policy.

On Apr. 6, 1998, Unit 1 experiences a generation derate, which is covered by the policy, of 50 MW for 1 hour which results in the insured having to purchase replacement power in order to satisfy its obligations to resell. According to the index designated by the insured, the market price of replacement power is $200/MWh.

The insurer must make substitute power available at the price of $1 00/MWh in an amount equal to the insured quantity as calculated below at the point of delivery or, alternatively and at the insurer's option, the insurer must pay the insured for a replacement power loss in the amount of $2,500 which is calculated by multiplying the market price of replacement power minus the insured price [$200/MWh–$100/MWh] by the insured quantity, which is the total quantity of the unplanned derate event minus the capacity deductible [50 MW–25 MW] by the insured hours [1 hour].

EXAMPLE 7

The facts are the same as in Example 6 except that the derate occurs and ends on Apr. 5, 1998, a Sunday, which does not fall within the insured hours designated by the insured. The insurer has no indemnification obligation.

EXAMPLE 8

The insured is a power marketer with a "unit contingent" contract with a power supplier pursuant to which the power supplier supplies power to the power marketer. Under the "unit contingent" contract, the power supplier is not obligated to supply power to the power marketer. The power marketer, however, is obligated to resell 100 MW of the power it purchases from the power supplier at a price of $1 00/MWh for a period of 1 week (the week of Apr. 13 through Apr. 17, 1998) to another. The power supplier is new in the industry and its financial stability is unknown. Thus, the insured seeks performance risk protection under an insurance policy for its one week contract.

The insured purchases coverage for the performance risks of the power supplier; from a period of Mar. 1, 1998, through Sep. 30, 1998, five days a week (Monday through Friday), 16 peak hours a day. The aggregate coverage period limit designated by the insured is $15,000,000 in aggregate. The capacity deductible designated by the insured is 25 MW. The insured quantity designated by the insured is the total megawatt quantity of the unplanned event, i.e., performance failure by the supplier less the deductible. The insured price designated by the insured is $100/MWh for the entire coverage period. The market price for replacement power is designated by the insured to be that price as indicated by a particular power market index. The insured designates a point of delivery for substitute power.

The insurer calculates the premium based upon the factors designated by the insured as well as other factors. The insurer receives the premium from the insured and issues the policy.

On Apr. 6, 1998, the power supplier files for bankruptcy and, thus, fails to supply power to the insured, which results in the insured having to secure other power in order to satisfy its obligations under the one-week contract. According to the index designated by the insured, the market price of replacement power is $200/MWh.

The insurer must make substitute power available in an amount equal to the insured quantity as calculated below at the price of $100/MWh at the point of delivery, or alternatively and at the insurer's option, the insurer must pay the insured for a replacement power loss in the amount of $600,000, which is calculated by multiplying the market price of replacement power minus the insured price [$200/MWh–$100/MWh]; by the insured quantity, which is the total quantity of the unplanned power event minus the capacity deductible [100 MW–25 MW]; by the insured hours [80 hours].

EXAMPLE 9

The insured is a power supplier with a contract to provide 100 MW of power to a power purchaser in Area C for $100/MWh. The insured purchases coverage which includes protection from intervention by a control area, from a period of Jan. 1, 1998 through Dec. 31, 1998, seven days a week, 24 hours a day. The insured designates one electrical power source which generates the power it uses to supply the purchaser in Area C, Unit 1, which has a dependable capacity of 100 MW. The aggregate coverage period limit designated by the insured is $10 million. The capacity deductible designated by the insured is 50 MW for the insured unit. The insured quantity designated by the insured is the total megawatt quantity of the unplanned event, i.e., intervention by the control area, less the capacity deductible, but in no event shall the insured quantity exceed 100 MW. The insured price designated by the insured is $100/MWh for the entire coverage period. The market price for replacement power is designated by the insured to be the actual price of replacement power. The insured designates a point of delivery for substitute power.

The insurer calculates the premium based upon, among others, the factors designated by the insured. The insurer receives the premium from the insured and issues the policy.

On Feb. 3, 1998, the control area instructs the generator that it can not supply power to Area C for a period of 2 hours. This results in the insured having to purchase power in order to satisfy its obligations under its contract with the purchaser in Area C. The market price (the actual cost) of replacement power is $200/MWh. The insurer must make substitute power available in an amount equal to the insured quantity as calculated below at the price of $100/MWh at the point of delivery or, alternatively and at the insurer's option, the insurer must pay the insured for a replacement power loss in the amount of $10,000 which is calculated by multiplying the market price of replacement power minus the insured price [$200/MWh–$100/MWh]; by the insured quantity, which is the total quantity of the unplanned event minus the capacity deductible [100 MW–50 MW]; by the insured hours [2 hours].

EXAMPLE 10

The facts are the same as in Example 9 except that the control area instructs the generator that it must back down the power into area C by an amount of 45 MW. Because the insured has designated the capacity deductible to be 50 MW and the total megawatt quantity of the unplanned event (45 MW) has not exceeded the capacity deductible, the insurer has no indemnification obligation.

| EXEMPLARY CERTIFICATE OF INSURANCE |
|---|
| INSURANCE CERTIFICATE |
| Named Insured: |
| Policy Number: |
| Certificate Number: |
| (Attaches to and forms a part of this Policy) |
| Coverage Type: |
| Retroactive Effective Date: |
| Coverage Effective Date: |
| Coverage Expiration Date: |
| Insured Units: |
| (With Dependable Capacity) |
| Insured Event: |
| Insured Quantity: |
| Outage/Derate Limit: |
| Insured Price: |
| Market Price Index: |
| Insured Hours: |
| Coinsurance: |
| Aggregate Capacity Deductible: |
| Aggregate Dollar Deductible: |
| Aggregate Coverage Period Limit: |
| Points of Delivery: |
| Endorsements: |
| (Attached at the time of issuance) |
| Premium: |
| Premium—due & payable on or before: |

Our obligation to make the coverage indicated on this Certificate available to you shall not become legally binding unless this Certificate is signed by us, issued to you, and we have received the premium designated above, if the premium is not paid as indicated then this Certificate shall be immediately void with respect to the Coverage for which the premium was to be paid and we shall have no obligations with respect to the proposed Coverage.

This Certificate, the Policy to which it is attached, and any executed Confidentiality and Non Disclosure Agreement, the terms of which are in full force and effect unless otherwise modified by this Policy, set forth your and our understanding of the insured transaction and, subject to all of the terms and conditions of the Policy, contains all the agreements between you and us, written and oral.

This Certificate amends and replaces certain provisions in the attached Policy. Any inconsistencies between this Certificate and the Policy shall be resolved in favor of this Certificate.

By the signature below of our duly authorized representative, we hereby issue this Certificate effective as of the Coverage Effective Date indicated above.

Insurance Company
By:

<p align="center">Exemplary Insurance Policy<br>Power Insurance Policy</p>

| INSURANCE CERTIFICATE | |
|---|---|
| Policy Number: | 98765 |
| Certificate Number: | 43321 |
| Named Insured: | XYZ Company |
| Coverage Type: | Generation Outage and Derate Protection |
| Coverage Effective Date: | Aug. 2, 1999 |
| Coverage Expiration Date: | Dec. 15, 1999 |
| Aggregate Coverage Period Limit: | $20,000,000 in aggregate for the portfolio of all Insured Units |
| Insured Quantity: | (i) the hourly concurrent Unplanned Outages, which is determined by the seasonal Dependable Capacity less the Deductible, and (ii) the concurrent Unplanned Derates, which is determined by the derated capacity less the Deductible, among the Insured Units but in no event will the Insured Quantity exceed five hundred (500) megawatts. |
| Insured Price: | August $2^{nd}$ through August $31^{st}$ - $150 per MWh; September $1^{st}$ through September $30^{th}$ - $90 per MWh; October $1^{st}$ through December $15^{th}$ - $45 per MWh. |
| Insured Hours: | 5 × 12 |
| Insured Units: | The following units with the stated net summer rated Dependable Capacity: Unit 1, rated at 18 megawatts; Unit 2, rated at 19 megawatts; Unit 3, rated at 39 megawatts; The above are owned and operated by the XYZ Company. The ABC Plant, located near City A, State Z, which is owned and operated by the ABC Cooperative and from which XYZ Company has the right to purchase 150 megawatts. |
| Market Price Index: | The actual energy costs, stated in dollars per megawatt hour, at which you, acting in a commercially reasonable manner and under a duty to mitigate losses, procure Replacement Power. References in the Policy to Intra-Day Adjustments shall be disregarded. |
| Points of Delivery: | ABC Control Area. |
| Insured Event: | During the Insured Hours of the Coverage Period, the Insured Units that are in an Unplanned Outage or Unplanned Derate that establish an Insured Quantity and the Market Price Index is greater than the Insured Price which causes you to incur a Replacement Power Loss. |
| Coinsurance: | NIL |
| Aggregate Capacity Deductible: | Twenty (20) megawatts per insured Unit. |
| Endorsements: | Section 16.0 (o) shall not be included in the Policy. |
| Premium: | Premium Amount set by Insurer |
| Premium - due and payable on or before: | August 2, 1999 |
| Premium Discount: | N/A |

Our obligation to make the coverage indicated on this Certificate available to you shall not become legally binding unless this Certificate is signed by us, issued to you, and we have received the premium designated above. If the premium is not paid as indicated then this Certificate shall be immediately void with respect to the coverage for which the premium was to be paid and we shall have no obligations with respect to the terminated coverage.

This Certificate, the Policy to which it is attached, and any executed Confidentiality and Non Disclosure Agreement, the terms of which are in full force and effect unless otherwise modified by this Policy, set forth your and our understanding of the insured transaction and, subject to all of the terms and conditions of the Policy, contains all the agreements between you and us, verbal and non verbal.

This Certificate amends and replaces certain provisions in the attached Policy. Any inconsistencies between this Certificate and the Policy shall be resolved in favor of this Certificate.

By the signature below of our duly authorized representative, we hereby issue this Certificate effective as of the Coverage Effective Date indicated above.

---
Insurance Company
By: _____

POLICY DECLARATIONS
Named Insured: XYZ Company
Policy Number: 98765
Policy Effective Date: Aug. 2, 1999
Policy Expiration Date: Dec. 15, 1999
Your Representative: J.M. Representative
Mailing Address: XYZ Road
Telephone: (555) 555-5555
Fax: (555) 555-5555
Our Representative: K.M. Representative
Mailing Address: ABC Street
Telephone: (111) 111-1111
Fax: (111) 111-1111
---

Definitions

Throughout this Policy ("Policy"), the words "you" and "your" refer to the Named Insured shown on the Policy Declarations. The words "we," "us" and "our" refer to Insurance Company. The term Policy used throughout this document includes any Policy Declarations ("Declarations"), Insurance Certificates ("Certificates"), and applicable endorsements. The meanings given to the defined terms are equally applicable to the singular and plural forms. As used in this Policy, any initially capitalized terms shall have the stated meanings and values as defined below or in the text:

"Aggregate Coverage Period Limit" means the maximum dollar amount, specified on each Certificate, that we will pay for the total of all Replacement Power Losses during the Coverage Period.

"Aggregate Capacity Deductible" means the megawatt amount, specified on each Certificate, that is subtracted from either 1) the total megawatt quantity of Unplanned Outages and, if designated on the Certificate, Unplanned Derates of the Insured Units or 2) each Insured Unit to determine the Insured Quantity.

"Aggregate Dollar Deductible" means the dollar amount of Replacement Power Losses, specified on each Certificate, that must be exceeded before we are responsible for making any claim payments. You are obligated to retain this loss.

"Cancellation" means the unilateral ability of either party to terminate or allow the Policy to expire.

"Coinsurance" means the percentage, if any, that is multiplied by each Replacement Power Loss, subject to any other limitations, to determine the dollar amount of each Replacement Power Loss that is to be retained by you.

"Commercial Operation" means, for each Insured Unit, the state of being: 1) electrically connected to the grid, producing electricity, and not in any Unplanned Outage or Unplanned Derate that may result in an Insured Event, or 2) available to the grid without any known conditions that may affect the ability of the Insured Unit to deliver power to the grid.

"Control Area" means an electric power system or combination of electric power systems bounded by interconnection metering and telemetry to which a common generation control scheme is applied.

"Coverage" means the events and obligations so designated on any Certificate issued under this Policy.

"Coverage Effective Date" and "Coverage Expiration Date" mean the dates so indicated and is the period of time for which each Certificate is in effect. All Coverage Effective Dates begin at 12:01 A.M. standard time and all Coverage Expiration Dates end at 12:01 A.M. standard time in the tune zone at the location identified under Market Price Index. In the event the Market Price Index identifies two (2) or more time zones, the first time zone identified shall govern.

"Coverage Period" means the period beginning on the Coverage Effective Date and ending upon the earlier of the Coverage Expiration Date or the Cancellation or Termination of either the Certificate or Policy.

"Coverage Type" means a general description of the Coverage.

"Dependable Capacity" means the Maximum Capacity of each Insured Unit, in megawatts, modified for ambient and any other known limitations for a specific period of time such as a month or a season. You must designate the Dependable Capacity that each Insured Unit can sustain over the Coverage Period.

"Expiration" means the natural progression of time over which both parties either elect not to negotiate or fail to reach an agreement to continue the business relationship and the Policy is not renewed and this has the same effect as a Cancellation or Termination of Coverage.

"Insured Event" means the event designated on the Certificate which causes you to incur a Replacement Power Loss.

"Insured Hours" means the time period over which our Coverage is in effect and it is usually designated as 5×16 or 7×24. The first number indicates the number of days of the week followed by the number of hours in the day. For example, the 5×16 designation refers to the five (5) weekdays (Monday through Friday) excluding any holidays as defined by the North American Electric Reliability Council or its successors and the sixteen (16) hours usually refer to the sixteen (16) On peak hours.

"Insured Price" means the dollar per megawatt hour amount specified on a Certificate that is subtracted from the Market Price Index to determine any Replacement Power Loss.

"Insured Quantity" means the total megawatt quantity designated on the Certificate and which is used to determine any Replacement Power Loss.

"Insured Units" means the generating unit or units identified on a Certificate.

"Market Price Index" means the description designated on each Certificate that is used to represent the market value of Replacement Power and is used to determine any Replacement Power Loss.

"Maximum Capacity" means the maximum megawatt capacity of each Insured Unit and is defined in the Institute of Electrical and Electronic Engineers (IEEE) Standard Definitions For Use Reporting Electric Generating Unit Reliability, Availability, and Productivity (ANSI/IEEE Std. 762-1987).

"Named Insured" means the entity or company so designated and to which we shall make any claim payments.

"Notification" means the actions that you must take to notify us that you have an event that might result in a claim.

"Off-Peak Day" means any day designated as an off-peak day by the North American Electric Reliability Council or its successor.

"On-Peak Day" means a day other than an Off-Peak day.

"Outage/Derate Limit" means the consecutive calendar days that each Unplanned Outage and, if designated on a Certificate, Unplanned Derate of any Insured Unit can contribute to the Insured Quantity. For any Unplanned Outage, the consecutive calendar days start from the time the Insured Unit is electrically disconnected from the grid and lasts until the earlier of 1) the Insured Unit is in Commercial Operation or 2) the expiration of the Outage/Derate Limit. For any Unplanned Derate, the consecutive calendar days start from the initiation of the Unplanned Derate and lasts until the earlier of 1) the Insured Unit is capable of achieving a generating level that is greater than the level it was generating at during the Unplanned Derate, or 2) the expiration of the Outage/Derate Limit.

"Planned Derating" means that portion of an Insured Unit derating that is scheduled well in advance and is defined in the Institute of Electrical and Electronic Engineers (IEEE) Standard Definitions For Use Reporting Electric Generating Unit Reliability, Availability, and Productivity (ANSI/IEEE Std. 762-1987) and is not covered by this Policy.

"Planned Outage" means any outage that is scheduled well in advance and which is defined in the Institute of Electrical and Electronic Engineers (IEEE) Standard Definitions For Use Reporting Electric Generating Unit Reliability, Availability, and Productivity (ANSI/IEEE Std. 762-1987) and is not covered by this Policy.

"Policy" means this policy of insurance, together with the Policy Declarations, any endorsements, and Certificates.

"Policy Effective Date" and "Policy Expiration Date" mean the dates so indicated on the Policy and is the period of time for which each Policy is in effect. All Policy Effective Dates begin at 12:01 A.M. standard time and all Policy Expiration Dates end at 12:01 A.M. standard time in the time zone at the location identified under Market Price Index. In the event the Market Price Index identifies two (2) time zones; the first time zone identified shall govern.

"Policy Period" means the period beginning on the Policy Effective Date and ending upon the earlier of the Policy Expiration Date or the cancellation or termination of the Policy.

"Points of Delivery" mean the transmission level points of delivery that are available to the Open Access Same-time Information System ("OASIS") and any open access transmission tariffs that are on file with the Federal Energy Regulatory Commission ("FERC") and the transmission level points of delivery designated on the Certificate at which we may make Substitute Power available to you.

"Replacement Power" means the electric energy that you either 1) purchase to fulfill your obligations or 2) could have scheduled for sale during an Unplanned Outage and, if designated on a Certificate an Unplanned Derate.

"Replacement Power Loss" means the total of the loss, in dollars that results from an Insured Event and is calculated by the sum of the products, over the Insured Hours, of (x) and (y) where (x) equals the dollar amount by which the Market Price Index exceeds the Insured Price and (y) equals the Insured Quantity.

"Retroactive Effective Date" means the date indicated, if any, on a Certificate and is the time that each Retroactive Period begins. All Retroactive Effective Dates begin at 12:01 A.M. standard time and end at the start of the Coverage Effective Date in the time zone at the location identified under Market Price Index.

"Retroactive Period" means the period of time from the Retroactive Effective Date until the Coverage Effective Date during which any Unplanned Outage and, if designated on the Certificate, Unplanned Derate occurs and extends into the Coverage Period will be included in the detennination of an Insured Quantity during the Coverage Period. The duration of the Retroactive Period can not exceed the designated Outage/Derate Limit.

"Seasonal Derating" means the megawatt difference between Maximum Capacity and Dependable Capacity and which is defined in the Institute of Electrical and Electronic Engineers (IEEE) Standard Definitions For Use Reporting Electric Generating Unit Reliability, Availability, and Productivity (ANSI/IEEE Std. 762-1987) and which is not covered by this Policy.

"Substitute Power" means at any time during an Unplanned Outage and, if designated on a Certificate, an Unplanned Derate, the electric energy that we may make available to you at the Point of Delivery for purchase at the Insured Price in lieu of paying you the amount of the Replacement Power Loss.

"Termination" means the Cancellation or Expiration of a Policy or Certificate.

"Unplanned Derate" means, if designated, the condition in which a portion of an Insured Unit's Dependable Capacity is not available because of an equipment limitation that is not a result of any Seasonal Derating, Planned Derating, the extension of any Planned Derating or any other limitation that is not covered by this Policy. Unplanned Derates are:

(a) Class 1, otherwise known as immediate, which requires an immediate action that reduces the ability of the Insured Unit to produce electrical energy;

(b) Class 2, otherwise known as delayed, which requires the reduction of the Insured Unit's ability to produce electrical energy within six (6) hours; and (c) Class 3, otherwise known as postponed, which requires the reduction of the Insured Unit's ability to produce electrical energy before the end of the next weekend.

"Unplanned Outage" means the condition in which an Insured Unit is not electrically connected to the grid but is not in a Planned Outage or any other limitation that is not covered by us. Unplanned Outages are:

(a) Class 0, otherwise known as a starting failure, which results from the unsuccessful attempt to connect the Insured Unit to the electrical grid from either a Planned or Unplanned Outage;

(b) Class 1, otherwise known as an immediate outage, which requires the immediate removal of the Insured Unit from being electrically connected to the grid;

(c) Class 2, otherwise known as delayed, which requires the removal of the insured Unit from being electrically connected to the grid within six (6) hours; and (d) Class 3, otherwise known as postponed, which requires that the Insured Unit be removed from being electrically connected to the grid before the end of the next weekend.

Insuring Agreement

In consideration of the premium paid as indicated on the Certificate and in reliance on the warranties and representations made by you in applying for this Policy and any Certificate we agree as follows:

1.0 Coverage 1.1 We will indemnify you up to the applicable Aggregate Coverage Period Limit for any Replacement Power Loss, subject to any Coinsurance, Aggregate Dollar Deductible or any other limitations for the Insured Units that are in an Unplanned Outage and, if designated on the Certificate, an Unplanned Derate, subject to the Outage/Derate Limit, during the Insured Hours of the Coverage Period.

1.2 We will either pay you any Replacement Power Loss that you incur, or make Substitute Power available at one or more Points of Delivery for you to purchase at the Insured Price, subject to the other provisions of this Policy.

1.3 We shall have no obligations for any Replacement Power Loss occurring during times when Substitute Power is available at one or more Points of Delivery for you to purchase at or below the Insured Price.

1.4 Each Insured Unit must be in Commercial Operation on the Coverage Effective Date or at the start of the Retroactive Effective Date. Any Unplanned Outage or Unplanned Derate that occurs prior to the Coverage Effective Date or the Retroactive Effective Date and extends into the Coverage Period or the Retroactive Period, subject to the OutagelDerate Limit, is not covered until that Insured Unit is placed back into Commercial Operation. If a Retroactive Effective Date is designated then any Insured Unit that experiences an Unplanned Outage or Unplanned Derate during the Retroactive Period, subject to the Outage/Derate Limit, which extends into the Coverage Period is covered but only from the start of the Coverage Period. For example, If no Retroactive Effective Date was designated or if the Retroactive Effective Date was after May 26$^{th}$ and an Unplanned Outage occurred on May 26$^{th}$ and lasted until June 15$^{th}$ with the Coverage Effective Date designated as June 1$^{st}$, no coverage would be in effect until June 15$^{th}$ when the Insured Unit was in Commercial Operation. However, if the Retroactive Effective Date was May 15$^{th}$ and an Unplanned Outage, subject to the Outage/Derate Limit, occurred on May 26$^{th}$ and lasted until June 15$^{th}$ and the Coverage Effective Date was designated as June 1$^{st}$ Coverage would begin June 1$^{st}$. If an Unplanned Outage occurred before the end of the Coverage Period and extended beyond the end date of the Coverage Period, it would only be eligible for Coverage to the end of the stated Coverage Period.

2.0 Coverage Limits

We shall have no obligation to make a payment for a Replacement Power Loss or to supply Substitute Power in excess of the Aggregate Coverage Period Limit set forth on the Certificate.

Conditions 3.0 Agreements 3.1 You agree that this Policy, the Policy Declarations, all Certificates, and any statements you have made in applying for this Policy are your agreements and representations and that all such statements are true and correct and that you will so state in an examination under oath, and that we have issued this Policy and any Certificate in reliance upon the truth of such agreements and representations. Each of your agreements is to be effective for the duration of the Policy and all shall survive the issuance and delivery of this Policy.

3.2 You agree that you are duly organized and validly existing under the laws of the state of your organization, have all requisite legal power and authority, and have obtained all necessary consents and approvals to enter into this Policy and to carry out the terms, conditions and provisions and that, upon our acceptance of this Policy, they shall become valid, legal and binding obligations.

3.3 You agree that there are no actions, suits or proceedings pending, or to your knowledge threatened, against or affecting you that might adversely affect your ability to fulfill your obligations under this Policy.

3.4 You agree that any Replacement Power Loss shall be adjusted with and payable to you and the receipt of such Replacement Power Loss shall constitute a release in full of all liability under this Policy with respect to that Replacement Power Loss claim.

4.0 Claims Reporting 4.1 You agree that you shall report to our representative shown on the Declarations page any Notification by telephone or electronic mail within one (1) business day after coming to your attention, and include your understanding of the events that have occurred or that may soon occur as they relate to a potential claim under This Policy.

4.2 Within one (1) business day of your Notification to us, you must confirm in writing, by facsimile or electronic mail, to our representative shown on the Declarations the full details of the claim 4.3 Once we receive your Notification, we will request within ten (10) business days, any such documentation as we may reasonably request to verify the amount of any potential Replacement Power Loss, including documentation sufficient to verify the quantity and price of electricity you purchased and you shall include any documentation sufficient to verify the value of the Market Price Index, if such Market Price Index is not independently published.

4.4 Any amount that we are obligated to pay you for a Replacement Power Loss shall be due and payable for each month in arrears within twenty (20) business days after we receive sufficient documentation. All amounts paid or payable shall be subject to audit and adjustment within six (6) months after the Replacement Power Loss occurs if data available within that time period establish that information previously used to calculate the Replacement Power Loss was inaccurate.

5.0 Time Limits for Claims

You agree that the stated time limits for reporting or submitting documentation and reporting claims shall not be extended or otherwise varied without our prior written consent. Any valid losses reported after the Notification period, but within one (1) month of the start of an Insured Event shall be covered by this Policy. No claims shall be honored with respect to that portion of any Insured Event occurring after the Policy Expiration Date, Coverage Expiration Date, Termination orCancellation of either the Policy or any Certificate, whichever is the earliest.

6.0 Notice of Change

You agree that you shall notify us within five (5) business days if there is any material change in the risk we are covering, in your financial condition, or any other substantial change, such as a merger, consolidation, or substantial conveyance of assets, including any change that substantially impairs your ability to fulfill any of your material obligations covered under this Policy, any Certificates, or any material contracts to which you are a party.

7.0 Books and Records

You agree that you will keep complete and accurate books and records and make all necessary entries to reflect transactions involving your purchase or sale of power, transmission, distribution or other services related to your purchase or sale of power, end facts giving rise to such transactions. You will keep accurate and complete copies of all communications relating to the Market Price Index, performance of your suppliers, ancillary services, and billing. You wilt keep us fully and accurately informed as to the location of all such books and records and shall permit us or our agents to have access at any reasonable time and from time to time to review all such books and records which we may request.

8.0 Maintaining Insurance 8.1 You agree that during this Policy you will maintain, with financially sound and reputable insurance companies, insurance on yourself and your properties, if any, in at least such amounts and against such risks as are customarily insured against by entities engaged in the same or similar business.

8.2 You agree to furnish to us from time to time during the duration of the Policy, upon written request, copies of the policies under which such insurance is issued, certificates of insurance and any other information relating to such insurance as we may reasonably request except that you do not have to produce policies subject to confidentiality provisions and may, instead, produce certificates of insurance for such policies.

9.0 Legal Action Against Us—Indemnification 9.1 You agree that you may not bring any legal action against us unless you have complied with all the terms and conditions of this Policy and the action is started within one (1) year after the date of loss.

9.2 You agree to indemnify and hold us harmless from and against any liability to your customers or to any of their direct or indirect customers, or to your creditors or others making a claim arising out of our performance or obligations to perform under this Policy.

10.0 Fraud, Misrepresentation or Concealment

We can deny coverage under this Policy for any of the following:

(a) Fraud or material misrepresentations or omissions made by you in obtaining this Policy or any Certificate including, but not limited to, material misrepresentations or omissions made in applying for this Policy or any Certificate, in continuing this Policy or in presenting a claim for Replacement Power Loss under this Policy or any Certificate; or (b) A material breach of any of your representations or agreements in this Policy or any Certificate.

11.0 Cancellation 11.1 You may cancel this Policy by giving us written notice at least thirty (30) calendar days prior to the date Cancellation is to take effect. At and after the effective date of Cancellation, we shall have no obligation whatsoever to honor any claim arising after the effective date of Cancellation and shall have no liability under this Policy or any Certificate.

11.2 We may cancel this Policy:

(a) upon five (5) calendar days written notice of Cancellation if there is any material breach of your obligations, provided, however, that Coverage will be reinstated effective as of the date of correction of such material breach, if you correct the material breach within thirty (30) calendar days of our notice of cancellation;

(b) immediately and retroactively if you fail to pay us any amount due to us on the due date of such payment;

(c) upon thirty (30) calendar days written notice of Cancellation, if there is any material adverse change in your organization; or (d) immediately, if you become insolvent or file for bankruptcy or if a bankruptcy petition is filed against you that is not discharged within sixty (60) calendar days from the date of filing. At and after the effective date of Cancellation, we shall have no obligation whatsoever to honor any claim arising after the effective date of Cancellation and shall have no liability under this Policy or any Certificate.

12.0 Refunds 12.1 In the event we have received a premium payment and the policy is canceled by you or us sixty (60 calendar days before the Coverage Effective Date, then we shall return 50% of the premium for that Coverage Period and 80% of the premium, if paid, for any later Coverage Periods to you.

12.2 In the event we have received a premium payment and you or we cancel the policy after the Coverage Effective Date, then we shall return no premium for that Coverage Period and 80% of the premium, if paid, for any later Coverage Periods to you. We will refund the difference, if any, between any premium you paid us and that which is due to you as a result of the above less any claims incurred during the Coverage Period, provided you have certified to us that all claims or events which may lead to a claim or claims during the Coverage Period have been reported by you to us.

13.0 Subrogation 13.1 If we pay a claim for a Replacement Power Loss or supply Substitute Power, we shall be subrogated, to the extent of such payment and to the extent of any loss we may incur in supplying Substitute Power to all your rights of recovery from such other party, including any other insurance carrier whose policy may apply. You will execute and deliver instruments and papers and do whatever else is necessary to secure such rights. We will have no right of subrogation against any party, which is an insured under the Policy. In other words, your rights of recovery against any person or organization responsible for the loss become ours up to any amount we have paid on your behalf.

13.2 You will act in concert with us and all other interests concerned in the exercise of any such rights of recovery and do nothing to prejudice our rights of subrogation after a loss. If any amount is recovered as a result of such proceedings, the net amount recovered after deducting the cost of recovery will accrue first to us to the extent that we have reimbursed you for any Replacement Power Loss, or for any loss we incur in supplying Substitute Power. Any excess of this amount will be remitted to you. If there is no recovery, you and we will bear the expense of the proceedings proportionately to each of our respective interest in the claims for recovery.

13.3 Notwithstanding any other provision, we shall be under no obligation to honor a claim if we cannot enforce our rights of subrogation because of your material breach of the contracts to which we are subrogated.

14.0 Limit of Our Liability for Breach

Our maximum aggregate liability for any and all claims arising out of or relating to the performance or breach of our obligations under this Policy, whether based upon contract, tort (regardless of degree of fault or negligence), strict liability or otherwise, shall in no event exceed an amount equal to ten (10) percent of the Aggregate Coverage Period Limit set forth on the Certificate in dispute. In no event shall we be liable for any incidental, indirect, consequential, special, exemplary, penal or punitive damages of any nature arising out of or relating to the performance or breach of our obligations under this Policy.

Exclusions 15.0 Special Conditions 15.1 Notwithstanding any other provision of this Policy, we shall not pay for:

a) any damages or costs of any nature related to pollution, including actual, alleged or potential presence in the environment of any substance that has or is alleged to have the effect of making the environment impure, harmful, or dangerous;

b) any damages or costs of any nature related to any Control Area charges that result from an Unplanned Outage or Unplanned Derate;

c) any physical damage that may occur regardless of the cause even if such physical damage results in an Unplanned Outage or Unplanned Derate;

d) any liability to third parties;

e) any uncontrolled or uncontained nuclear reaction, radiation or radioactive contamination regardless of how such events may have been caused; and f) any extension of an Unplanned Outage or Unplanned Derate beyond that required to rebuild, repair, or replace any such part that has been destroyed or damaged with the exercise of due diligence and dispatch, if you are responsible for operating, repairing, or maintaining any Insured Unit.

15.2 Notwithstanding any other provision of this Policy, Coverage will not be in effect from Dec. 15, 1999 through Jan. 15, 2000 regardless of the Coverage Period.

16.0 Excluded Causes

Coverage is void for:

a) any unilateral governmental intervention (other than the imposition of Taxes, defined below), court injunction or changes in law, regulation or statute, including a diversion of power by order of public authority (whether valid or invalid);

b) any of your or your customers willful acts performed with the intent to cause or aggravate a Replacement Power Loss;

c) any infidelity, fraud, conversion or embezzlement by you, your employees, officem, directors, trustees or authorized representatives;

d) another party's breach of contractual obligations to you or such party's negligence or misconduct;

e) any action or non action by or inability to obtain, or keep your necessary state and/or federal regulatory authority approvals that by the exercise of due diligence you would have obtained or kept;

f) power that can not be delivered or accepted;

g) you not being under a legal obligation to deliver power;

h) any failure, malfunction or inadequacy of any computer hardware, software, operating system, or network, or of any services, data or functions that use or rely upon or that are used by or relied upon by any of them, due to the inability to correctly interpret or process one or more dates or times, including but not limited to the year 2000;

i) any acts of nature including without limitation, flood, earth movement, tornado, named storms, fire, solar flares, or magnetic disturbance;

j) any riot, sabotage, terrorism or civil disorder;

k) any strikes or labor actions;

l) any declared or undeclared war or insurrection or any of their consequences;

m) any transmission, transmission substation, subtransmission, distribution, distribution substation or related event;

n) any action by any transmission provider, including your affiliated entities, or any Control Area even if such action results in an Unplanned Outage or an Unplanned Derate;

o) any change in fuel quality or type;

p) any event that occurs outside the boundaries of the plant that prevents fuel from being delivered, including any interruption of fuel supply;

q) any environmental rule, regulation or decree;

r) any manufacturer's decree, suggestion, or recommendation that requests, requires or recommends the removal of any Insured Unit from service but only if such decree, suggestion, or reconunendation affects ten (10) or more units that are in service in the United States;

s) any extension of a Planned Outage or a Planned Derate regardless of whether it is classified as an Unplanned Outage or Unplanned Derate;

t) any failure of equipment that is electrically downstream of the high-voltage terminal of the generator step-up transformer, even if that equipment is located within the boundaries of the plant;

u) any extension of an Unplanned Outage or Unplanned Derate that results from additional work, beyond that required to correct the reason for the Unplanned Outage or Unplanned Derate, which extends the time required to correct the reason for the Unplanned Outage or Unplanned Derate;

v) any Insured Unit that is not in Commercial Operation at the Coverage Effective Date, subject to any Retroactive Effective Date, until such Insured Unit is placed into Commercial Operation after the Coverage Effective Date or the Retroactive Effective Date; or w) any maintenance outages (class 4) or deferred derates (class 4) regardless of whether they are classified as an Unplanned Outage or Unplanned Derate.

If these Excluded Causes were to affect other entities engaged in a business similar to you and the price of power increased as a result, and an Insured Event, unrelated to the Excluded Causes, occurred to you, we would cover you, subject to the terms and conditions set forth in this Policy.

Additional Terms 16.0 Other Insurance 16.1 If there is any other insurance payable to you that cover the losses that are covered under this Policy, whether prior to, subsequent to, or simultaneous with this insurance and by whomsoever effected, which, in the absence of this insurance, would cover the losses covered under this Policy, whether you can collect or not, then we shall not be liable for more than the excess over and above such other insurance, but in no event will our liability exceed any of the limits set forth on the applicable Certificate.

16.2 If you have any other insurance subject to the same terms, conditions, and provisions that cover the losses that are covered under this Policy and is payable to you, then we shall pay our share of the covered loss in the proportion that the Aggregate Coverage Period Limit or any other applicable limit on the Certificate bears to all the other limits of insurance that cover the same basis.

17.0 Taxes

This Policy does not cover the cost of any federal, state or local sales, use, excise, property or other taxes or governmental impositions, or payments in lieu of such taxes or impositions (collectively, "Taxes") levied upon or measured by the value of any transaction contemplated by this Policy, including but not limited to Substitute Power supplied pursuant to this Policy, all of which Taxes, if any, shall be borne or reimbursed by you, regardless of whether you or we have responsibility under applicable laws and regulations to pay or collect such Taxes.

18.0 Rights of Recovery

Payment or performance by us with respect to a claim shall not constitute a waiver or otherwise bar our right to recover from you the value of any claim that we were under no obligation to pay.

19.0 Transfer of Interest in This Policy

Your rights and duties under this Policy may not be assigned or delegated without our prior written consent and our consent shall be reasonably given. In the absence of such consent, any such assignment or delegation shall be null and void.

20.0 No Third Party Liability or Beneficiaries

This Policy is being issued solely for your benefit, and no other person or entity shall have the right to enforce any of its provisions against us.

21.0 Severability

If any article or provision of this Policy is found to be invalid, illegal, or unenforceable in any way by a Court of competent jurisdiction or any authority with the legal right to so rule, the balance of this Policy shall continue to be in full force and effect, so long as the economic or legal substance of this Policy is not materially affected in any manner adverse to either you or us and if any provision or article is so found, you and we shall negotiate in good faith to modify this Policy so as to effect the original intent as closely as possible.

22.0 Government Authority

This Policy and all rights and obligations under this Policy are subject to all applicable federal, state, and local laws, and duly promulgated orders and actions of government authorities. If any transaction related to this Policy requires the approval or authorization of any government body, yours and our rights and obligations shall be subjected to obtaining such approval or authorization and you and we agree to cooperate and use reasonable efforts to obtain such approval or authorization.

23.0 Headings

The section headings contained in this Policy are for purposes of reference and convenience only and do not limit or otherwise affect the meaning of any of the provisions.

24.0 Communications

All notices or communications concerning this Policy or any Certificate shall be addressed to the respective representatives at the addresses set forth on the Declarations page. All notices shall be in writing and shall be given by a commercial courier service, registered, certified, or first class mail, telex, telecopy, or facsimile transmission at the addresses so listed. You and we may, by written notice to the other, change the representative and address to which such notices and communications are to be sent.

25.0 Changes

The terms and conditions of this Policy can be supplemented, amended or waived only by written endorsement issued by us and made a part of this Policy.

26.0 Attachment Clause

This Policy is made and accepted subject to its terms and conditions and any other terms and conditions that are made part of this Policy by our endorsement.

27.0 Governing Law

This Policy shall be construed in accordance with the internal laws of the Commonwealth of Pennsylvania without regard to the conflict of laws provisions thereof. Any provision of this Policy that would be invalid under the laws of the state in which this Policy is issued shall be amended to the extent necessary for such provision to be in conformance with such law.

It will be understood by persons skilled in the art that various changes in the factors, details, components, steps, and arrangements of the components and steps which have been described and illustrated in order to explain the nature of this invention may be made by those skilled in the art without departing from the principle and scope of the invention as expressed in the following claims.

It will be understood by persons skilled in the art that various changes in the factors, details, components, steps, and arrangements of the components and steps which have been described and illustrated in order to explain the nature of this invention may be made by those skilled in the art without departing from the principle and scope of the invention as expressed in the following claims.

What is claimed is:

1. A computer programmed method for reducing risk actually assumed by at least one of a plurality of parties, wherein at least one of said parties supplies electric power to at least one other of said parties, and if an unplanned, non-catastrophic at least partial failure to supply adequate electric power occurs, at least one of said parties assumes said risk, said method comprising:

calculating via a computer program at least one factor associated with said supplying of electric power, wherein, based on the at least one factor, said computer program determines whether an unplanned inadequacy of supply of said electric power that occurs upon a non-catastrophic event is a qualifying event;

designating by the computer program of at least one cost offset compensation range and at least one additional power compensation range which will simultaneously at least partially reduce said risk actually assumed by said at least one of said parties assuming said risk if said unplanned inadequacy occurs and is determined to be a qualifying event;

establishing within the computer program a relationship between said at least one of said parties assuming said risk and at least one other party, wherein said at least one other party agrees to provide said compensation ranges to said at least one of said parties assuming said risk if said unplanned inadequacy occurs and is determined to be a qualifying event; and, issuing an insurance policy from a computer associated with the computer program wherein said compensation ranges are provided at the time of said unplanned inadequacy; and wherein at least one of the parties supplies electric power to at least one other of said parties, and if said unplanned inadequacy occurs, at least one of said parties assumes a majority of said risk.

2. The method of claim 1, wherein said risk is an at least financial risk.

3. The method of claim 2, wherein said compensation comprises supplying substitute power.

4. The method of claim 2, wherein said compensation comprises financial compensation.

5. The method of claim 4, wherein said financial compensation is at least partially dependent upon a market price for replacement power.

6. The method of claim 5, wherein said financial compensation is further at least partially dependent upon a price for power supplied between said plurality of parties.

7. The method of claim 1, wherein said established relationship between said at least one of said parties assuming said risk and said at least one other party caps said compensation provided by said other party.

8. The method of claim 1, wherein said at least one factor comprises a power capacity.

9. The method of claim 8, wherein said at least one factor further comprises a power capacity deductible.

10. The method of claim 9, wherein said power capacity deductible is an aggregate capacity deductible.

11. The method of claim 1, wherein said at least one factor comprises at least one factor selected from the group consisting of: designating particular electric power generation or transmission equipment, designating one or more points of delivery, designating a coinsurance percentage of said risk, one or more counter-party performances, a price of power, a type of failure to supply said electric power, a deductible, and one or more periods of time.

12. The method of claim 1, wherein said establishing said relationship between said at least one of said parties assuming said risk and said at least one other party comprises said other party establishing an obligation to said at least one of said parties assuming said risk.

13. The method of claim 1, further comprising establishing at least one exclusion to said compensation being provided.

14. The method of claim 1, wherein said at least one exclusion comprises an exclusion associated with a price of replacement power.

15. The method of claim 1, wherein said one of said parties supplying said electric power is a utility.

16. The method of claim 1, wherein said one of said parties supplying said electric power is a power re-marketer.

17. The method of claim 1, wherein said one of said parties supplying said electric power is a load aggregator.

18. The method of claim 1, wherein said qualifying event comprises a failure of electric power transmission.

19. The method of claim 1, wherein said qualifying event comprises a failure of electric power generation.

20. The method of claim 1, wherein said qualifying event comprises a failure to perform an underlying power supply contract.

21. The method of claim 1, wherein said qualifying event comprises a control area intervention.

22. The method of claim 18, 19, 20 or 21, wherein an unplanned outage is associated with said qualifying event.

23. The method of claim 18, 19, 20 or 21, wherein an unplanned derate is associated with said qualifying event.

24. The method of claim 1, wherein said establishing said relationship between said at least one of said parties assuming said risk and said at least one other party comprises establishing an insurance policy.

25. The method of claim 1, wherein said relationship established between said at least one of said parties assuming said risk and said at least one other party expires after a given time.

26. A computer-readable medium comprising computer-executable instructions for preparing a contingent benefit conferring obligation for reducing an actual risk assumed by a risk assuming at least one of a plurality of parties, wherein at least one of said parties supplies electric power to at least one other of said parties, and if an unplanned, non-catastrophic at least partial failure to supply adequate electric power occurs, said risk assuming at least one of said parties actually assumes said risk, said computer-executable instructions comprising:

instructions for designating data indicative of at least one factor associated with said supplying of electric power and for identifying if an unplanned at least partial failure to supply said adequate electric power which occurs after a non-catastrophic event is a qualifying failure;

instructions for designating data indicative of a compensation which will at least partially reduce said assumed risk, wherein said compensation includes at least supplying additional electric power and a simultaneous payment for offsetting costs of said supplied additional electric power, if an unplanned at least partial failure to supply said electric power occurs and is determined to be a qualifying failure; and, instructions for generating at least one document associated with said contingent benefit conferring obligation at least partially dependently upon said designated data indicative of at least one factor and said designated data indicative of said compensation;

wherein, said benefit conferring obligation is between said risk assuming at least one of said parties and at least one other party, and wherein said at least one other party agrees to provide said compensation to said risk assuming at least one of said parties if an unplanned at least partial failure to supply said adequate electric power occurs and is determined to be a qualifying failure, immediately upon occurrence of said at least partial failure to supply adequate electrical power.

27. The computer-readable medium of claim 26, wherein said risk is an at least financial risk.

28. The computer-readable medium of claim 27, wherein said compensation comprises supplying substitute power.

29. The computer-readable medium of claim 27, wherein said compensation comprises financial compensation.

30. The computer-readable medium of claim 29, wherein said financial compensation is at least partially dependent upon a market price for replacement power.

31. The computer-readable medium of claim 30, wherein said financial compensation is further at least partially dependent upon a price for power supplied between said plurality of parties.

32. The computer-readable medium of claim 26, wherein said benefit conferring obligation caps said compensation provided.

33. The computer-readable medium of claim 26, wherein said at least one factor comprises a power capacity.

34. The computer-readable medium of claim 33, wherein said at least one factor further comprises a power capacity deductible.

35. The computer-readable medium of claim 34, wherein said power capacity deductible includes an aggregate capacity deductible.

36. The computer-readable medium of claim 26, wherein said benefit conferring obligation includes at least one exclusion to compensation being provided.

37. The computer-readable medium of claim 36, wherein said at least one exclusion comprises an exclusion associated with a price of replacement power.

38. The computer-readable medium of claim 26, wherein the benefit conferring obligation is effective for a given time period.

* * * * *